No. 634,486. Patented Oct. 10, 1899.
W. VANDERMAN.
BATHING APPLIANCE.
(Application filed Aug. 11, 1897. Renewed Aug. 11, 1899.)

(No Model.)

Witnesses:
William H. Barker.
Orma P. Coffin.

Inventor:
William Vanderman
by Chas. L. Burdett,
Attorney.

UNITED STATES PATENT OFFICE.

WILLIAM VANDERMAN, OF WILLIMANTIC, CONNECTICUT.

BATHING APPLIANCE.

SPECIFICATION forming part of Letters Patent No. 634,486, dated October 10, 1899.

Application filed August 11, 1897. Renewed August 11, 1899. Serial No. 726,942. (No model.)

*To all whom it may concern:*

Be it known that I, WILLIAM VANDERMAN, a citizen of the United States, and a resident of Willimantic, in the county of Hartford and State of Connecticut, have invented certain new and useful Improvements in Bathing Appliances, of which the following is a full, clear, and exact description, whereby any one skilled in the art can make and use the same.

My invention relates to the class of devices used for bathing purposes; and the object of my invention is to provide a shower-bath that may be used in connection with a bath-tub or without and one that may be adjusted with reference to any position of the user.

To this end my invention consists in the details of the several parts making up the apparatus as a whole and in the combination of the parts, as hereinafter described, and more particularly pointed out in the claim.

Figure 1:
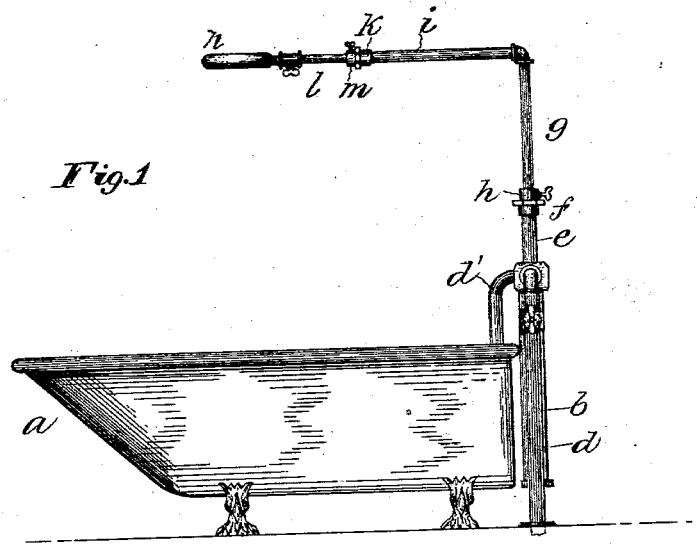
Figure 2:
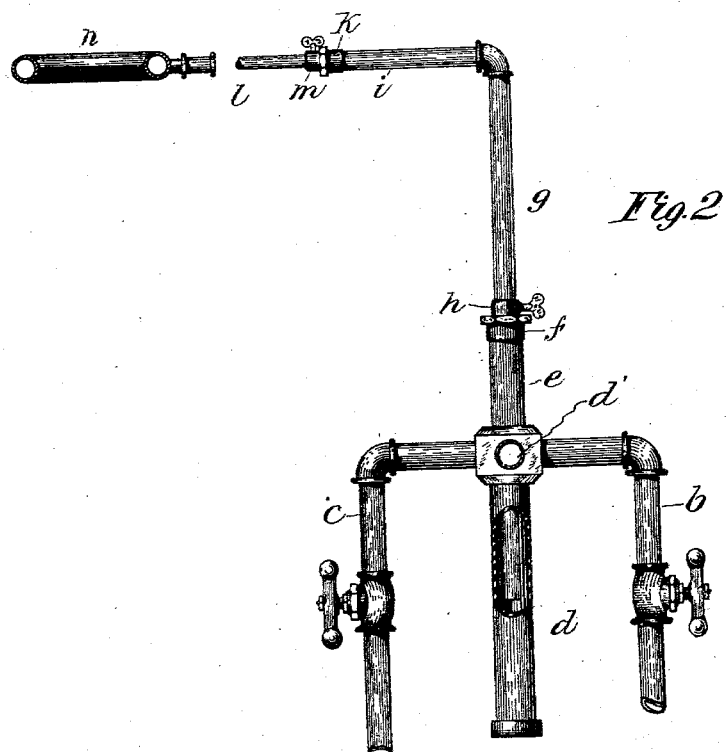

Referring to the drawings, Figure 1 is a view in side elevation of a bath-tub provided with my improvement. Fig. 2 is a detail view, on an enlarged scale and in front elevation, of the pipes leading to the tub, with parts broken away to show construction and with the horizontal pipe at right angles from the position of Fig. 1.

In the accompanying drawings the letter $a$ denotes a bath-tub supplied with a single outlet from the delivery-pipes thereto and common to the hot and cold water faucets, as is usual in the modern construction of tub. The delivery apparatus to the tub consists of two pipes $b$ $c$, delivering hot and cold water, respectively, each of these pipes being provided with suitable valves for controlling the flow of water. These pipes are connected with a chamber formed in the mixing-tube $d$, extending, preferably, downward between the pipes and having an upward-extending branch $e$. If this device is used in connection with a bath-tub, as herein shown, the pipes $b$ $c$ may be located in any desirable position with reference thereto, so that the valves may be readily accessible. A pipe $d'$ leads into the tub. A stuffing-box $f$ is located on the extension $e$, and a pipe $g$ extends downward through the stuffing-box and into the mixing-chamber, a clamping device $h$ being suitably constructed to secure the pipe $g$ in any desired position of vertical or rotary adjustment. The hot and cold water from the pipes $b$ $c$ flow into the mixing-chamber, passing downward outside of the pipe $g$, and this insures a thorough mixing of the hot and cold water before entering the pipe $g$. The pipe $g$ has a branch $i$ on its upper end, on the end of which is located a stuffing-box $k$. A pipe $l$ extends within the branch $i$, a clamp $m$ being used to locate the pipe in any desired position of horizontal adjustment. It is designed that a sprinkler $n$ be connected to the pipe $l$, as shown in the drawings.

The device above described is especially applicable in the construction of new work and provides a sprinkling apparatus or shower-bath that may be readily adjusted in any desired vertical position or in any desired horizontal position and is especially applicable in a bath-tub, the means described allowing the sprinkler to be placed over any desired point in the tube or located at any desired height therefrom; but it is obvious that it may be used independently of a tub, if desired.

I claim as my invention—

In combination in a bath apparatus, a conducting-pipe, a hot and cold water supply entering said pipe, a sectional delivery-pipe extending within and vertically adjustable within the conducting-pipe, the sections telescoping one within the other, and the outer section horizontally adjustable, and a delivery apparatus connected with the delivery-pipe.

WILLIAM VANDERMAN.

Witnesses:
WM. H. BARKER,
ARTHUR B. JENKINS.